Nov. 3, 1925.
W. W. RIEDEL
1,560,111
INDICATING DEVICE
Filed May 22, 1923
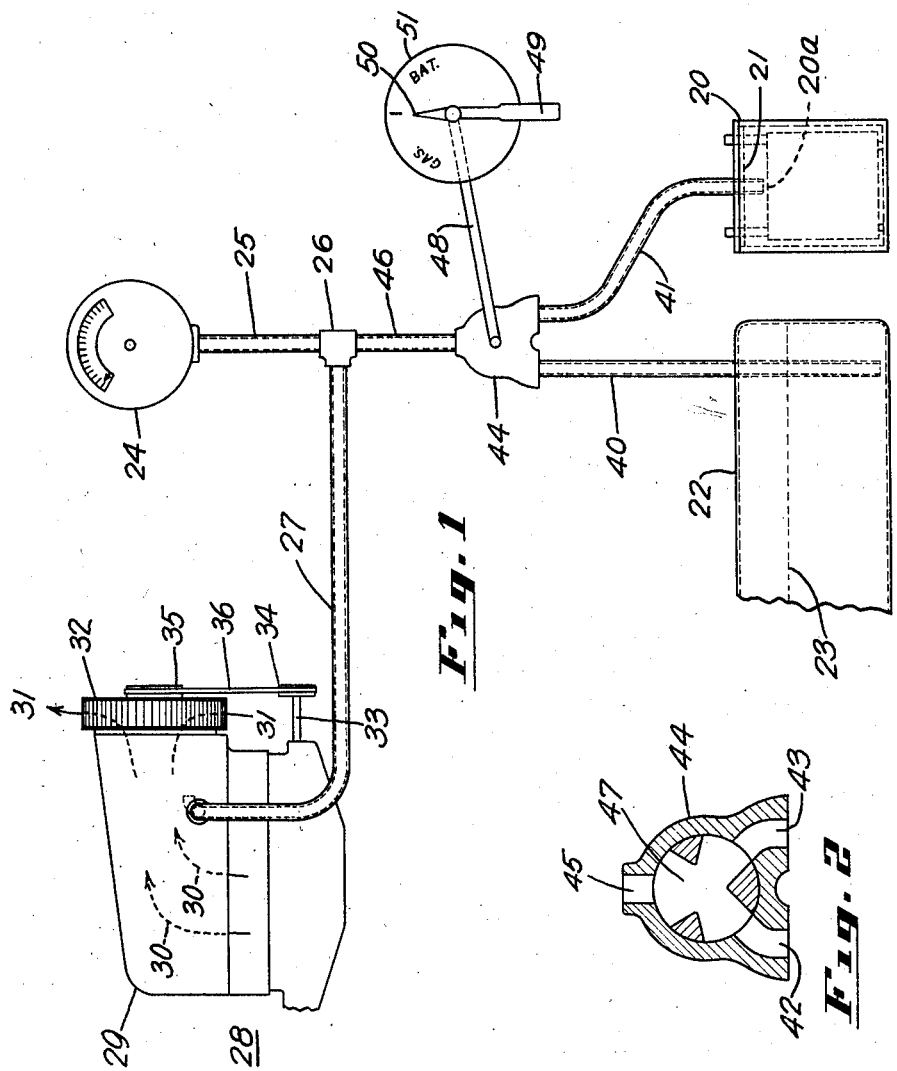

Patented Nov. 3, 1925.

1,560,111

UNITED STATES PATENT OFFICE.

WALTER W. RIEDEL, OF DAYTON, OHIO, ASSIGNOR TO GENERAL MOTORS RESEARCH CORPORATION, OF DAYTON, OHIO, A CORPORATION OF DELAWARE.

INDICATING DEVICE.

Application filed May 22, 1923. Serial No. 640,789.

*To all whom it may concern:*

Be it known that I, WALTER W. RIEDEL, a citizen of the United States of America, residing at Dayton, county of Montgomery, and State of Ohio, have invented certain new and useful Improvements in Indicating Devices, of which the following is a full, clear, and exact description.

This invention relates to apparatus for indicating the inadequacy of the supply of liquid in one or more vessels.

It is among the objects of the invention to give warning that the liquid level in one of a plurality of liquid containing vessels has reached a predetermined low point, and to ascertain in which of the vessels the supply of liquid is inadequate.

Further objects and advantages of the present invention will be apparent from the following description reference being had to the accompanying drawing wherein a preferred embodiment of the present invention is clearly shown.

In the drawings:

Fig. 1 is a side elevation showing diagrammatically a form of the present invention.

Fig. 2 is a sectional view of valve mechanism shown in Fig. 1.

The present invention is applicable to all sorts of apparatus where liquid containing vessels are employed. For purposes of illustration, the invention is shown applied to an automotive vehicle which carries an internal combustion engine, a fuel tank for the engine and a storage battery for supplying current for engine starting and ignition and other purposes. Such a vehicle is provided generally with such liquid containing vessels as the fuel tank, engine oil reservoir and storage battery. It is obviously necessary that each of these vessels contain an adequate supply of their respective liquids.

Fig. 1 shows two of these liquid containing vessels, namely, a storage battery cell 20 adapted to contain electrolyte as indicated by the level 21, and a fuel tank 22 for containing a fuel supply indicated by the level 23.

The apparatus for indicating the inadequacy of liquid in either of the vessels 20 or 22 or both of them, includes an instrument or partial vacuum indicating device 24 connected by pipe 25, T 26 and pipe 27 with the cooling system of an air cooled internal combustion engine 28. The engine is provided with a draft tube 29 through which air is caused to circulate as indicated by arrows 30 and 31, by means of a fan 32 driven by the engine shaft 33 through pulleys 34 and 35 and a belt 36. The engine cooling system when in operation constitutes a vacuum producing means producing a partial vacuum adjacent the end of the pipe 27 which projects through the draft tube 29 into the circulating air.

So long as the instrument 24 is not in communication with atmosphere it will register a partial vacuum. The instrument 24 may however be vented to atmosphere by means dependent upon the amount of liquid in the vessels 20 and 22. The venting means includes a duct for each vessel connected with the indicating instrument, namely, a duct 40 extending within the tank 22 and having its end terminating at a certain low liquid level in the tank, and a duct 41 extending within the battery cell 20 and having its lower end terminating slightly above the battery plates 20ª. Pipes 40 and 41 are connected with the ports 42 and 43 respectively of a valve body 44 having a port 45 connected by pipe 46 connected with the T 26. A valve 47 is rotatably supported by the valve body 44 and is adapted to connect pipes 40 and 41 with the pipe 46 as indicated in Fig. 2, or valve 47 may be turned to connect either the pipe 40 or the pipe 41 with the pipe 46.

Valve 47 is connected with a valve rod 48 to which is attached a handle 49 carrying a pointer 50 co-operating with an index plate 51 which can be mounted in any convenient position such as the instrument board of an automobile.

When the apparatus is in position shown in the drawings, and the liquid levels in the vessels 20 and 22 are above the ends of the pipes 41 and 40 respectively, the instrument 24 will be cut off from direct communication with atmosphere. During the operation of the engine the instrument 24 will register partial vacuum. If no vacuum is indicated, this shows that the instrument is vented to atmosphere through one or more of the vent ducts 40 or 41. In order to ascertain in which vessel the supply of liquid is inadequate the operator will turn the pointer 50 toward the word "Gas" on the plate 51. The valve 47 will then connect the pipe 46 only with the pipe 40. Should the instrument 24 register partial vacuum, this will show that the supply of liquid in the tank 22 is adequate, that is, the liquid has not fallen below a predetermined low level. The operator may turn the pointer 50 adjacent the word "Bat." If the instrument registers no vacuum, this is an indication that the electrolyte level has fallen below the end of the pipe 41 and that more electrolyte should be added to the battery cell.

This having been done, the operator will return the pointer 50 to neutral position as shown in Fig. 1, in order that the instrument 24 may be kept in communication with all of the vessels.

The instrument 24 may fail to indicate partial vacuum by reason of the liquid in the tank 22 having fallen below the end of pipe 40. This fact will be determined in the event that the instrument 24 still registers no vacuum after the pointer 50 has been turned to point to the word "Gas" on the indicating plate 51.

While the present invention is shown in connection with but two vessels, it is obvious that any number of vessels can individually or collectively be connected by suitable valve mechanism with the indicating instrument 24. For example, the invention could be adapted to indicate the inadequacy of liquid in the gasoline supply tank, the engine lubricant reservoir, and in all of the cells of the storage battery.

The instrument 24 would indicate no vacuum if the engine cooling system became inoperative for any cause such as failure of the belt 36. Therefore, before investigating the liquid levels in vessels 20 and 22, the operator would first inspect the air cooling system, and particularly the fan belt, to ascertain first whether the cooling system were operative, in order to be sure that a "no vacuum" indication by the instrument 24 indicated a low liquid level.

While the form of embodiment of the invention as described constitutes a preferred form, it is to be understood that other forms might be adopted, all coming within the scope of the claims which follow.

What I claim is as follows:

1. Apparatus for determining inadequacy of liquid in vessels comprising, in combination, a plurality of vessels for containing liquids; means connected with said vessels for indicating whether the liquid level in one or more of the vessels has fallen below a predetermined low point; and means cooperating with said indicating means and acting to bring about a change in the reading thereof, to thereby determine in which of the vessels the suply of liquid is inadequate.

2. Apparatus for determining inadequacy of liquid in vessels comprising, in combination, a plurality of vessels for containing liquids; of vacuum producing means; a device connected with said means for indicating partial vacuum; a plurality of ducts each for providing a vent to atmosphere and each extending to a certain level within a separate vessel for containing liquid; and means for connecting said indicating device with all the ducts or with only one of the ducts.

3. Apparatus for determining inadequacy of liquid in vessels comprising, in combination, a plurality of vessels for containing liquids; of vacuum producing means a device connected with said means for indicating partial vacuum; a plurality of ducts each for providing a vent to atmosphere and each extending to a certain level within a separate vessel for containing liquid; a valve body having ports connected respectively with said ducts and said indicating device; a valve operable to connect all the ports or to connect only one of the duct ports with the port connected with the indicating device; and means for indicating the vessel connected with the indicating device.

In testimony whereof I hereto affix my signature.

WALTER W. RIEDEL.